United States Patent
Jaynes et al.

(10) Patent No.: US 11,012,665 B2
(45) Date of Patent: May 18, 2021

(54) BRIDGING VIDEO CONFERENCE ROOM SYSTEM AND ASSOCIATED METHODS

(71) Applicant: Mersive Technologies, Inc., Denver, CO (US)

(72) Inventors: Christopher O. Jaynes, Denver, CO (US); Brandon Barron, Denver, CO (US); Ryan Lee, Highlands Ranch, CO (US); Justin McBride, Denver, CO (US); Brent Gardner, Denver, CO (US)

(73) Assignee: MERSIVE TECHNOLOGIES, INC., Denver, CO (US)

( * ) Notice: Subject to any disclaimer, the term of this patent is extended or adjusted under 35 U.S.C. 154(b) by 0 days.

(21) Appl. No.: 16/900,738

(22) Filed: Jun. 12, 2020

(65) Prior Publication Data

US 2020/0396416 A1 Dec. 17, 2020

Related U.S. Application Data

(60) Provisional application No. 62/861,185, filed on Jun. 13, 2019.

(51) Int. Cl.
*H04N 7/14* (2006.01)
*G06F 16/955* (2019.01)
*H04L 12/18* (2006.01)

(52) U.S. Cl.
CPC .......... *H04N 7/147* (2013.01); *G06F 16/955* (2019.01); *H04L 12/1822* (2013.01); *H04L 12/1827* (2013.01)

(58) Field of Classification Search
CPC .. H04N 7/14; H04N 7/15; H04L 12/18; G06F 16/955
USPC ............................ 348/14.01–14.16; 705/7.19
See application file for complete search history.

(56) References Cited

U.S. PATENT DOCUMENTS

| | | | |
|---|---|---|---|
| 2005/0013312 A1* | 1/2005 | Karlsen | H04N 21/4788 370/412 |
| 2012/0150956 A1 | 6/2012 | Tucker et al. | |
| 2012/0185291 A1* | 7/2012 | Ramaswamy | G06Q 10/1095 705/7.19 |
| 2014/0362171 A1 | 12/2014 | Wall et al. | |
| 2016/0205351 A1* | 7/2016 | Chan | H04N 7/15 348/14.09 |
| 2016/0247124 A1 | 8/2016 | Hoist et al. | |
| 2017/0099361 A1* | 4/2017 | Digilov | H04W 4/80 |
| 2017/0195128 A1 | 7/2017 | Ng et al. | |
| 2018/0013981 A1* | 1/2018 | Spattini | H04N 7/147 |

(Continued)

OTHER PUBLICATIONS

PCT/US2020/037628 International Search Report and Written Opinion dated Oct. 6, 2020, 12 pp.

*Primary Examiner* — Melur Ramakrishnaiah
(74) *Attorney, Agent, or Firm* — Lathrop GPM LLP

(57) ABSTRACT

A bridging video conference room system and method provides for using a client device to leverage the conference room infrastructure to hold a video conference with remote users. A user may indicate an intent to host a video conference to a room-host device, which may then detect and parse a calendar invitation to cause the video conference software to launch on the user's client device as a host of the meeting. Other client devices may share content to the video conference by sharing to the bridging video conference room system without joining the video conference separately.

20 Claims, 3 Drawing Sheets

(56) References Cited

U.S. PATENT DOCUMENTS

2018/0063208 A1 3/2018 Houchen et al.
2019/0149768 A1 5/2019 McArdle

* cited by examiner

BRIDGING VIDEO CONFERENCE ROOM SYSTEM AND ASSOCIATED METHODS

CROSS-REFERENCE TO RELATED APPLICATION

This application claims priority to and benefits from U.S. Provisional Application Ser. No. 62/861,185 filed Jun. 13, 2019, the entirety of which is incorporated by reference herein.

BACKGROUND

Video conference room systems typically include several components for use in facilitating a meeting or conference between remotely located participants. A typical video conference room system may contain the following components: an audio system such as a standalone microphone, speakers or telephone; a room camera, typically one with a wide field of view and deployed in a fixed location to support teams of users in the room who are participating in the meeting; and a codec unit that is responsible for call control (via SIP), audio, and video send (RSTP).

The room codec may also be used to present a user interface for starting/stopping a call, enabling/disabling video, and enabling/disabling content sharing. The controls are presented in the room—typically through a touch panel or some other interface.

Prior art video conference room systems have several shortcomings. First, they are dedicated to a single video conference software system. For example, the call control and user interface is designed and built around a single vendor—i.e. a Skype® room system. If a user in the room has been invited to a Zoom® conference—then the room system is simply not accessible for that meeting and the investment made into the system is diminished. Even when a room system provides interoperability through transcoding or other cloud-connector services, users are still required to operate the room with the dedicated video conferencing interface which means extra steps are required to join a conference being hosted by a different service. This requires users who are expecting to manage or join a call of a particular type to still interact with a video conferencing system that they are unfamiliar with.

Second, dedicated room systems are expensive to deploy and support. The expense is typically related to purchasing and maintaining a required video conferencing host system or a room PC with dedicated conferencing software installed. This means that for small and informal spaces they simply are not used. Third, users of a room system may be unfamiliar with the interface provided for a room dedicated to a single software system, even if they are familiar with the system in general. For example, users who may have used Skype on their desktop to chat and make calls may not use the same user-interface to start a call in a Skype video conference room system.

One of the most significant limitations in a dedicated video conference room system is that multiple users in the room cannot share content into the meeting simultaneously. In fact, to share content into the meeting—those users must "join" the meeting separately from the devices they brought to the room. For example, if a host starts a video conference call and another user is in the room with the host, that user may talk and be heard over the room system, as well as be seen by the remote users. But if the user wants to share a document from a laptop or other device, the device must be joined into the video conference separately.

Forcing users to "re-join" a meeting when they are already in the room has several drawbacks. It can be cumbersome in that the user must locate the video conference invitation on the device and bypass prompts that ask about dialing-in to the conference because the room audio is already being used. The user must also remember to ignore the camera on their own conference software to use the room camera. Most importantly, dedicated video conference software only allows one content source to be shared at a time. This requires coordination between a host and a user to allocate presenting duties, even though they are sitting in the same room.

SUMMARY OF THE EMBODIMENTS

In embodiments, a bridging video conference room system and method provides for using a client device to leverage the conference room infrastructure to hold a video conference with remote users. A user may indicate an intent to host a video conference to a room-host device, which may then detect and parse a calendar invitation to cause the video conference software to launch on the user's client device as a host of the meeting. Other client devices may share content to the video conference by sharing to the bridging video conference room system without joining the video conference separately.

DETAILED DESCRIPTION OF THE EMBODIMENTS

Figure 1:
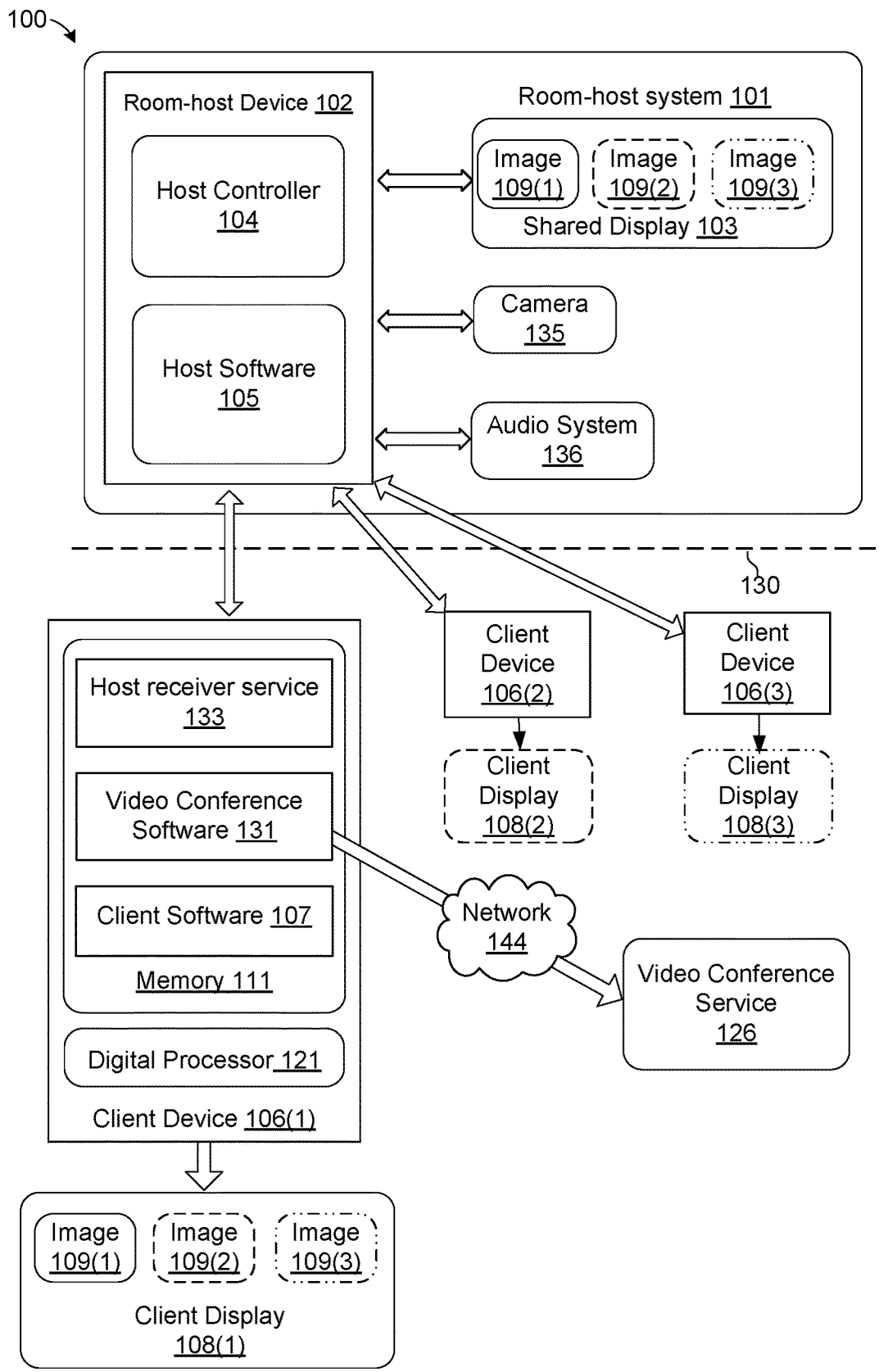
FIG. 1 is a diagram illustrating exemplary components of one bridging video conference room system, in an embodiment.

FIG. 1 shows exemplary components of the present bridging video conference room system 100, which comprises room-host system 101 and one or more client devices 106(*) (where the "*" symbol indicates an arbitrary device, each denoted separately by an integer in FIG. 1) which communicate with room-host system 101 via a network 130 such as the Internet. Client devices 106(*) may be coupled to room-host system 101 wirelessly or by means of a wired connection. As shown in FIG. 1, in an exemplary embodiment, room-host system 101 includes a network-enabled room-room-host device 102, camera 135, audio system 136 and shared display 103. Room-room-host device 102 may include host controller 104, for example a digital processor that executes host software 105 to provide the functionality described herein. It should be appreciated that host software 105 and host controller 104 may be implemented using discrete logic circuits, or other form of firmware, software, or hardware, without departing from the scope hereof. Room host controller 102 may include a codec unit that is responsible for call control (via SIP), audio, and video send (RSTP). The room codec may also be used to present a user interface for starting/stopping a call, enabling/disabling video, and enabling/disabling content sharing. The controls are presented in the room—typically through a touch panel or some other interface.

Each client device 106(*) may be any type of computer-controlled device with a digital processor 121 and a display 108(*) such as a desktop or laptop computer, tablet, or smart phone, etc. Client software 107, resident in memory 111 in each client device 106(*), may be implemented as transitory or non-transitory computer readable instructions that, when executed by digital processor 121, implement the functionality and tasks as described in detail below. It should be appreciated that client software 107 and digital processor 121 may be implemented using discrete logic circuits, or other form of firmware, software, or hardware, without departing from the scope hereof. As shown in FIG. 1, shared display 103 of room-host system 101 facilitates collaboration between client devices 106(*) by allowing each client device 106 to display an image 109(*) corresponding to all or a portion of client display 108(*) on shared display 103. Host software 105 also facilitates collaboration between users of client devices 106(*) as well as causes the contents of shared display 103 to appear on client displays, as shown for client display 108(1). Users may view shared display 103 together for a shared view of images 109(*) from any or all client devices 106 coupled to room-room-host device 102.

Memory 111 also stores video conference software 131 and host receiver service 133, as shown in client-host device 106(1), and similar modules may be included in client devices 106(*) (e.g., client devices 106(2) or 106(3)). Video conference software 131 includes software (or discrete logic circuitry as discussed above) running on a client device 106 that is able to connect to a video conference service 126, such as Zoom or WebEx. Video conference software 131 running on a client device 106(*) may be software that supports, for example, a video camera source, allows users to interact with the virtual camera to enable video, select the virtual camera as a source, and transmit that source to remote users who are connected in the video conference session. These typically include the client display and one or more connected cameras. A user operates video conference software 131 by selecting different sources to share as well as exercising other features common to video conference systems. By way of example, a user may initiate a call with a remote user at video conference service 126 over network 144, then type into a chat window, and activate a connected camera to allow remote viewers to view the user. In embodiments, video conference software may be implemented in a browser or as a separate application, for example.

Host receiver service 133 communicates with room-room-host device 102, through either a wired or wireless connection. Host receiver service 133 receives media frames (images or video) from the shared display 103 and transcodes (re-encodes) that data into a video stream format compliant with video conference software 131. Communication between the host receiver service 133 and a room-host system 101 takes place over network 130 and implements a protocol that allows host receiver service 133 to communicate directly with room-room-host device 102 of the room-host system 101. This allows the communication protocol between room-room-host device 102 and host receiver service 133 to be independent of the specific web conference endpoint being used on a client-host device 106(1). For purposes of illustration, network 130 and network 144 are drawn separately, but in embodiments, they may be the same.

Figure 2:
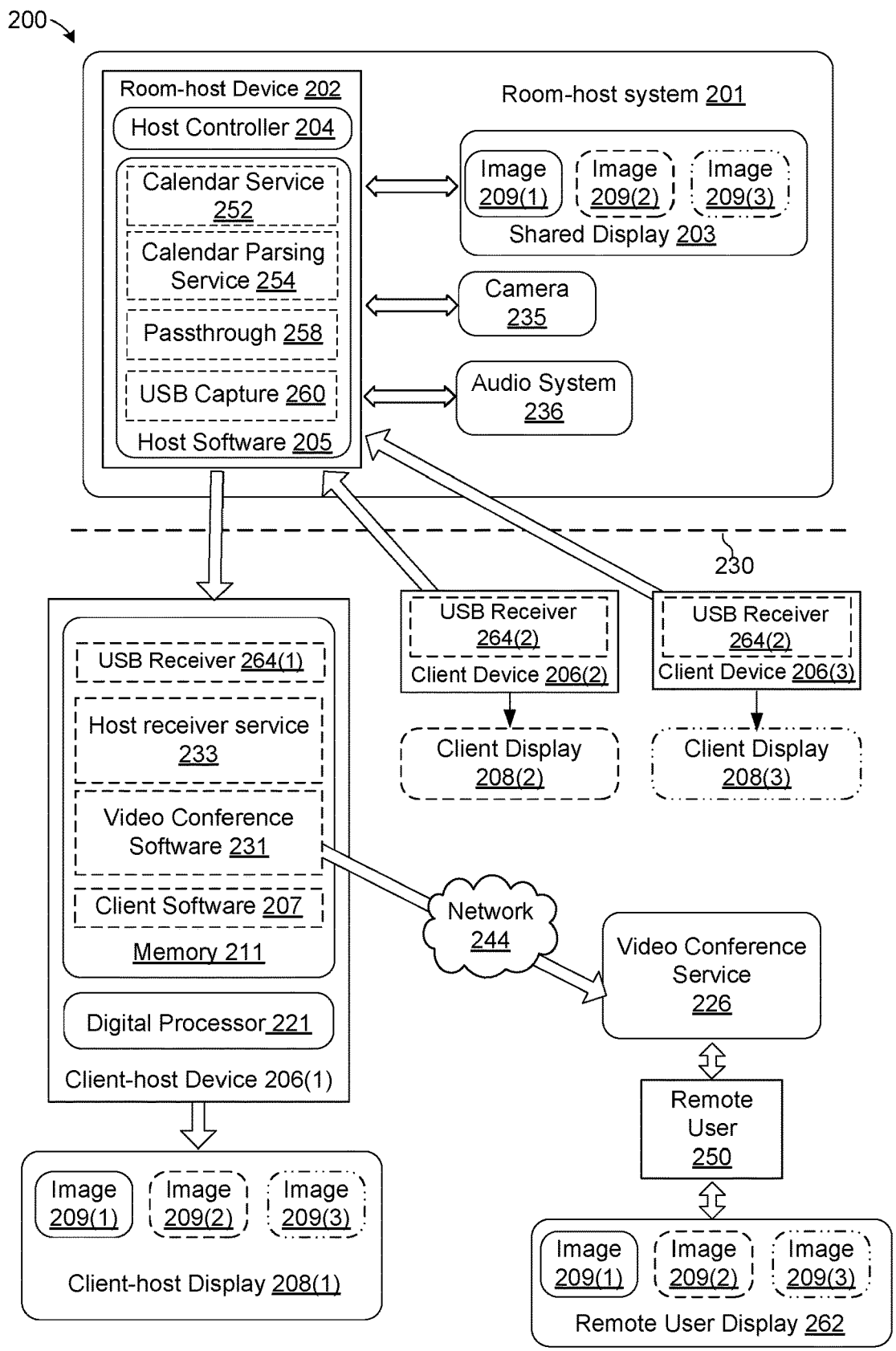
FIG. 2 is a diagram illustrating exemplary components of one bridging video conference room system that universally serves different video conference applications, in an embodiment.

FIG. 2 shows a more detailed version 200 of the bridging video conference room system of FIG. 1 that may be used with any type of video conference software. A room-host system 201 may detect a user's intent to host a meeting in the room, read a calendar to determine information about the meeting, and automatically launch video conference software on the user's device and initiate sharing to the display in the room. Other than the user indicating an intent to start a meeting, the process may be performed automatically through communication between various devices as explained below. Although the following embodiments are described in connection with client-host device 206(1), other client devices 206(*) may be used to control a video conference room.

As explained above for FIG. 1, client devices 206(*) connect to room-host device 202 over network 230 for a collaborative session of sharing displays 208(*) of client devices 206(*) on a shared display 203 of room-host system 201. Client software 207, resident in memory 211 in each client device 206(*) (as shown for client-host device 206(1)), may be implemented as transitory or non-transitory computer readable instructions that, when executed by digital processor 221, implement the functionality and tasks as described in detail below. It should be appreciated that client software 207 and digital processor 221 may be implemented using discrete logic circuits, or other form of firmware, software, or hardware, without departing from the scope hereof. As shown in FIG. 1, shared display 203 of room-host system 201 facilitates collaboration between client devices 206(*) by allowing each client device 206(*) to display an image 209(*) corresponding to all or a portion of client display 208(*) on shared display 203. Host software 205 also facilitates collaboration between users of client devices 206(*) as well as causes the contents of shared display 203 to appear on client displays 208(*), as shown for client-host display 208(1). Users may view shared display 203 together for a shared view of images 209(*) from any or all client devices 206 coupled to room-room-host device 202.

Any of client devices 206(*) may function as client-host device 206(1) in the following description. When a user wants to host a meeting using room-host system 201 for a video conference, the user communicates an intent to host the meeting to room-host device 202, as described in more detail below. As part of the meeting initiation process, client-host device 206(1) may download and/or run video conference software 231. Host receiver service 233, installed at the client-host device 206(1) communicates with room-host system 201 either wirelessly or via wired connection. Video conference software 231 communicates over network 244 with a video conference service 226 which may also be accessed by remote user 250. Although only one remote user 150 is shown, any number of remote users may connect to video conference service 226.

A calendar service 252 may be installed on the room-host device 202 and/or an external server (not shown) that receives calendar meeting invitations from the client-host device 206(1) directly and/or indirectly through the external server. In other embodiments, the calendar service 252 may be located at client-host device 206(1). Calendar meeting invitations may be detected by calendar service 252 in response to a user communicating an intent to host a meeting. Calendar meeting invitations may be located on client-host device 206(1) or on a calendar used for reserving the room, located either on room-room-host device 202 or on an external server accessible over network 230.

Calendar parsing service 254 is located at the room-host device 202 and/or with an external server, and takes a current calendar C, room time t, to produce meeting metadata that will be transmitted to the client-host device 206(1) on-demand. In embodiments, calendar parsing service 254 may be located at client-host device 206. The meeting metadata will be sent to (received by, accessed by, and/or otherwise used by) client-host device 206(1) on demand.

Calendar parsing service 254 processes the calendar based on room time to extract metadata that is meaningful to the client-host device's user experience and aides with automation. An example of the type of metadata that is transmitted between a client-host device and the calendar parsing service is {Vendor Identifier, Meeting Start Time, Meeting End Time, Meeting Title, URI link}. This information may be transmitted in a pre-defined format that the host receiver service 133 can then process. As an example, the format may comply with a common JSON key/value format. As an example, this formation may have a format such as {"WebEx", 10 am, 11 am, "Chris' Meeting", www.webex.com/meetingId=123123}, and may also include any necessary pin code or log-in information or other information as necessary.

Room-host system 201 may cause shared display 203 to display information that informs users to plug into (or otherwise wirelessly connect to) the room-host system based on this calendar information (for example, "Welcome to your WebEx® Meeting starting in 5 mins, connect to the room-host system to begin").

Once a meeting host starts a video conference session, the bridging video conference room system of FIG. 2 allows users to present content freely to the room that may then be shared over the video conference software 231 to video conference service 226 without requiring client computers 206 to explicitly join the video conference session. This provides a video conference experience for users in the room that is similar to video and voice transport users who are remote such as remote user 250.

Once the meeting metadata object is received—the host receiver service 233 then automatically executes the URI intent—causing the appropriate vendor software to open (or be downloaded) on the client-host device 206(1). In embodiments, the URI may first be transcoded into a different URI that provides more flexibility at client-host device. For example, the different URI may allow launching a specific version of the video conferencing service such as the "browser version" of Zoom instead of the native client. In this case, the URI in the metadata object may be modified to match the same meeting but with info that will map that URI to the web browser client and not the native client. In another example, the URI may be modified to point the user to a front-page URI with additional info that also includes an embedding version of the actual meeting URI for users to click. The client-host display 208(1) is automatically shared to the room-host system 201 for display on shared display 203. In embodiments, a user interface may be displayed on the shared room display 203 and/or the client-host device display 208(1) that may make use of the meeting metadata, for example, "Launching your "WebEx" meeting". Because the URI is generated by the original meeting invite, a user is able to automatically start and even join the meeting without the user having to manually implement the workflow that would be presented had the user simply clicked the meeting invite.

In addition, if there is no meeting metadata available (ad hoc meeting), the intent to start a meeting (i.e. a user plugs a cable between a client-host device and the room host system the cable or wirelessly connects to the client-host device to the host system) may result in presentation of a user interface that asks the user "How do you want to share this room?" with several options (e.g., WebEx, Zoom, etc.). Each of those links are embedded on the client-host display 208(1) and when clicked a generic URI/URL that either installs that software or, if it is installed, is launched.

Figure 3:
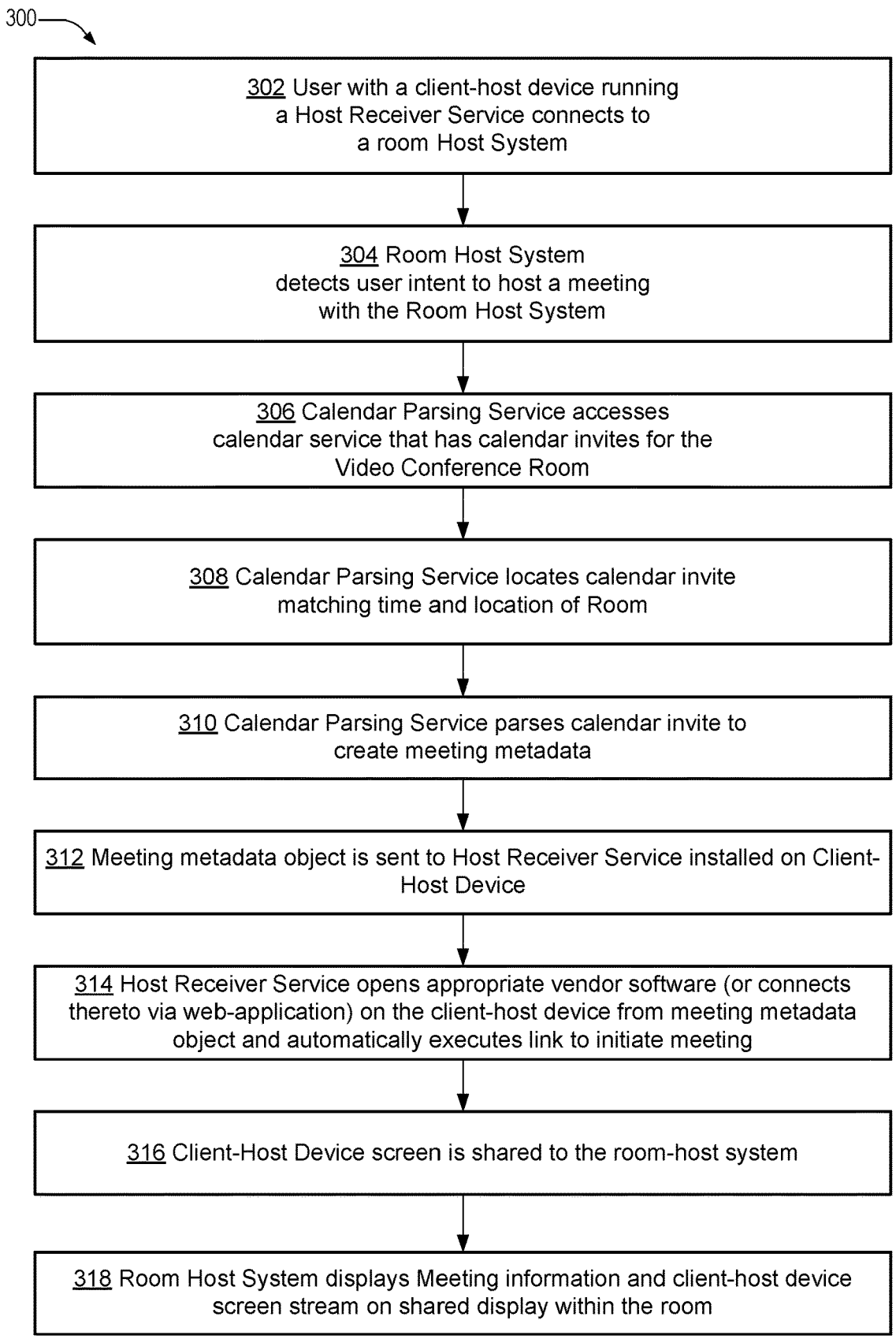
FIG. 3 is a flowchart illustrating an operation of the system of FIG. 2, in embodiments.

FIG. 3 is a flowchart showing an exemplary set of steps in a bridging video conference room method 300 performed in an exemplary embodiment. Method 300 is an automated process that replaces the need for in-room conferencing control because the meeting is hosted on one of the participant's laptops (e.g., client-host device 206(1)) in the room. Further, the meeting may be automatically initiated with a preferred conference software (or web application thereof) as well as a link to initiate the meeting.

In step 302, a user of a client-host device 206(1) that is running a host receiver service 233 connects to room-host system 201 to indicate the user's intent to begin a meeting in the video conference room. In an example of step 302, a user connects to the room-host system 201 by plugging a cable into room-host device 202 or initiating a wireless connection with room-host device 202.

In step 304, room-host system 201 detects a user's intent to begin a meeting in the room. In embodiments, a user's intent to start a meeting may also be detected by host receiver service 233. User intent may be indicated by plugging the client-host device 206(1) into the room-host system 201 or by the user of the client-host device 206(1) wirelessly connecting the client-host device 206(1) to the room-host device 202. Further, user intent may be determined by wirelessly detecting client-host device 206(1) is in the video conference room by using an occupancy determination process. For example, either client-host device 206(1) or room-host system 201 may use Bluetooth®, near-field communication (NFC) or another wireless protocol to detect and connect to each other in a hands-free manner. Further, host receiver service 233 may detect the presence of client-host device 206(1), then trigger a meeting start and connection of client-host device 206(1) to room-host device 202. In response to detection of user intent, a query may appear either on shared display 203, or on client-host device 206(1) indicating, for example "Looks like you are hosting a meeting in 5 mins, should we begin?" or a similar message.

In step 306, calendar parsing service 254 accesses calendar service 252 to locate calendar invites for the video conference room. In an example of step 306, calendar service 252 may be located in room-host device 202, on an external server or in client-host device 206(1). Calendar service 252 may be a software application such as Office 365, for example.

In step 308, calendar parsing service 254 locates a calendar invite matching a location of the video conference room and a current time. In step 310, calendar parsing service 254 parses the meeting invite that has been pulled from calendar service 252 and determines: Is there a meeting about to begin or already underway based on the current time? If yes, the meeting information in the calendar invite is processed to determine if the meeting is a video conference. Calendar parsing service 254 detects this by looking for common strings in standard meeting invites that are automatically generated by video conference applications (e.g. "You've been invited to a Zoom meeting."). If this is a video conference meeting, the invite is further processed by calendar parsing service 254 to extract the meeting start web link (known as a uniform resource indicator or URI). Calendar parsing service 254 then creates meeting metadata from the parsed information.

In step 312, meeting metadata is transmitted to host receiver service 233 installed on client-host device 106(1). In an example of step 312, meeting metadata may include connection information (IP Address and Port to connect and share to the room), as well as the Universal Resource Indicator (URI) and video conference application that will be used (if it is available), although other types of information may be included. In addition, host receiver service 233 may look at the received meeting metadata object and determine if the meeting host is that user previously registered, or otherwise identified as, associated with client-host device 206(1).

In step 314, host receiver service 233 automatically starts the meeting described in the meeting metadata object. In an example of step 314, host receiver service 233 launches video conference software 131 with the URI in the metadata. This brings client-host device 206(1) into a state where video conference software 231 is running for the meeting on the desktop without further intervention from the user initiating the meeting.

In step 316, display 208(1) of client-host device 206(1) is streamed to shared display 103 of room-host system 201. In an example of step 316, video conference software 231 screen (either on the desktop or running in the background of the client-host device 1206(1)) is automatically streamed or otherwise sent to the room-host device 202 for display on shared display 203 using the connection info that was transmitted in metadata. This streaming may be performed using a variety of transport mechanisms (i.e. a cable, or wireless).

In step 318, room-host system displays meeting information together with the display of client-host device. In an example of step 318, shared display 203 displays information identified the hosted meeting and other preferred content from display 208(1) of client-host device 206(1).

For a video conference hosted by room-host system 101, room-host device 102 manages the sharing of room camera 135 and an audio system 136 to remote users over video conference service 126. To instead allow arbitrary video conference software running on a user's client-host device 106(1) to provide video conference with remote users, it is necessary to also allow room camera 135 and audio system 136 to be shared through video conference software 131 of a client-host device 106(1). This functionality is provided by passthrough module 158 in room-host device 102, which passes feeds from camera 135 and audio system 136 to connected client devices 106(*) including client-host device 106(1) that is running video conference software 131 on demand.

Room camera 235 and audio system 236 are presented to connected user(s) client devices 206(*) (either wirelessly or through the USB cable) as though they were connected to the device directly. This "passthrough" mechanism is a communications pipeline that forwards all device traffic for a specific set of client devices 206(*) connected to room-host device 202—but at the same time can support other device types directly. For example, if a user plugs a USB drive into a USB port of room-host system 201, traffic/protocol is not forwarded and room-host system 201 may read the USB drive directly using USB capture module 260. However, if a client device 206(*) is connected to a USB port of room-host device 202, USB capture module 260 may capture traffic at room-host device 202 and then transmit it to the USB receiver 264(*) that presents itself like a USB device or USB composite device to client device 206(*). USB capture module 260 may include a network variable buffering system, flow control, and error control to ensure smooth deliver of audio video under variable network conditions (latency/jitter) that are not considered important as part of the normal USB protocol. In embodiments, USB capture module 260 captures USB traffic, encodes it into a more appropriate network protocol and then transmits those USB payloads to USB receiver 264(*) of client device 206(*). Client device 206(*) receives the USB payloads and turns the network stream into a series of USB packets that conform to the USB device protocol at the client.

In addition, passthrough 258 may support other USB device traffic in parallel with the passthrough traffic, for example, metadata including connection information and the meeting URI. For example, USB traffic may be modified as it is passed to a client device by changing a vendor name. In this example, if a company prefers to have all cameras branded with a company name, regardless of the vendor of the camera 235, then the vendor string in the USB traffic may be replaced with the preferred information.

In embodiments, shared display 203 is encoded and made available as a video stream on the client-host device 206(1) and other client devices (e.g., devices 206(2), 206(3) in FIG. 2) operatively connected (wired or wirelessly) to room-host system 201 as soon as meeting start event is detected, i.e., when a user plugs a cable between the client-host device 202 and a room-host device 202, and/or wirelessly connects the client-host device 206 and the room-host device 202. Thus, whatever appears on shared display 203 can be shared as a "single" source of content in the conference room meeting. In addition, room-host device 202 allows multiple users on distinct client devices 206(*) to connect and share content to room-host system 201. This content then is effectively shared through the video conference service 226 to remote user 250 for display on remote user display 262.

An advantage of this system is that room-host device 202 may support any type of device over a single video conference including, for example, an iPad next to an Android phone, a Windows laptop next to a OSX laptop, or a DVD player (hard wired into the Pod) next to an iPad. Thus, not only is room-host system 101 not limited to a particular video conference system, it is also not limited to a specific device type.

Combinations of Features

Features described above as well as those claimed below may be combined in various ways without departing from the scope hereof. The following enumerated examples illustrate some possible, non-limiting combinations:

(A1) A method for controlling a bridging video conference room system, the bridging video conference room system comprising a shared display, a camera and an audio system operatively coupled to a network-enabled room-host device, including receiving, from a client-host device, an intent to connect to the room-host device and host a meeting at a video conference room; accessing a calendar service to identify and parse a meeting invitation to create meeting metadata; transmitting the meeting metadata to the client-host device to launch video conference software on the client-host device; and transmitting streams from at least one of the shared display, the camera and the audio system to the client-host device for use by the video conference software.

(A2) In method (A1), parsing a room calendar associated with the video conference room to identify the meeting invitation.

(A3) In method (A2), the meeting metadata further comprises at a Vendor Identifier, and a URI link.

(A4) In method (A2), the meeting metadata further comprises a Meeting Start Time, a Meeting End Time and Meeting Title.

(A5) In any of methods (A1)-(A4), the client-host device further comprises a desktop or laptop computer, tablet, or smart phone.

(A6) In any of methods (A1)-(A5), the intent to connect to the room-host device further comprises a wireless connection to the host device.

(A7) In any of methods (A1)-(A6), the intent to connect to the room-host device further comprises detecting a presence of the client-host device in the video conference room based on a wireless occupancy determination.

(A8) In any of methods (A1)-(A7), the method includes receiving an intent to connect to the room-host device from a client device; receiving content from the client device and displaying it on the shared display; encoding the shared display into a shared-display video stream; and transmitting, to the client-host device and the client device, the shared-display video stream.

(B1) A bridging conference room system, including a shared display; a camera; an audio system; and a network-enabled room-host device operatively coupled to the shared display, the camera and the audio system, the network-enabled room-host device adapted to: receive, from a client-host device, an intent to connect to the room-host device and host a meeting at a bridging video conference room; access a calendar service to identify and parse a meeting invitation to create meeting metadata; transmit the meeting metadata to the client-host device to launch video conference software on the client-host device; and transmit streams from at least one of the shared display, the camera and the audio system to the client-host device for use by the video conference software.

(B2) In method (B1), the room-host device is further adapted to parse a room calendar associated with the bridging video conference room to identify the meeting invitation.

(B3) In method (B2), the meeting metadata further comprises at a Vendor Identifier, and a URI link.

(B4) In method (B2), the meeting metadata further comprises a Meeting Start Time, a Meeting End Time and Meeting Title.

(B5) In any of methods (B1)-(B4), the first client device further comprises a desktop or laptop computer, tablet, or smart phone.

(B6) In any of methods (B1)-(B5), the intent to connect to the room-host device includes a wireless connection to the room-host device.

(B7) In any of methods (B1)-(B6), the intent to connect to the room-host device includes detecting a presence of the client-host device in the bridging video conference room based on a wireless occupancy determination.

(B8) In any of methods (B1)-(B7), wherein the host device is further adapted to: receive an intent to connect to the room-host device from a client device; receive content from the client device and displaying it on the shared display; encode the shared display into a shared-display video stream; and transmit, to the client-host device and the client device, the shared-display video stream.

(C1) A method for controlling a bridging video conference room system, the bridging video conference room system comprising a shared display, a camera and an audio system operatively coupled to a network-enabled room-host device, includes operatively coupling a client device to the host device through a USB port; capturing traffic at the host device to transmit to the client device; encoding the captured traffic into USB payloads using a network-variable buffering system, flow control, and error control to ensure smooth deliver of audio video under variable network conditions; receiving the USB payloads at the client device; and converting the USB payloads into USB packets for processing by the client device.

(C2) In the method (C1), running video conference software for connecting with remote users on the client device; and transmitting the USB packets to the video conference software.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A method for controlling a bridging video conference room system, the bridging video conference room system comprising a shared display, a camera and an audio system operatively coupled to a network-enabled room-host device, the method comprising:
   receiving, from a client-host device, an intent to connect to the room-host device and host a meeting in the bridging video conference room by running video conference software on the client-host device;
   accessing a calendar service to identify and parse a meeting invitation to create meeting metadata;
   transmitting the meeting metadata to the client-host device to launch the video conference software on the client-host device; and
   transmitting streams from at least one of the shared display, the camera and the audio system to the client-host device for use by the video conference software.

2. The method of claim 1, further comprising parsing a room calendar associated with the video conference room to identify the meeting invitation.

3. The method of claim 2, wherein the meeting metadata further comprises at a Vendor Identifier, and a URI link.

4. The method of claim 2, wherein the meeting metadata further comprises a Meeting Start Time, a Meeting End Time and Meeting Title.

5. The method of claim 1, wherein the client-host device further comprises a desktop or laptop computer, tablet, or smart phone.

6. The method of claim 5, wherein the intent to connect to the room-host device further comprises a wireless connection to the hest room-host device.

7. The method of claim 6, the intent to connect to the room-host device further comprises detecting a presence of the client-host device in the bridging video conference room based on a wireless occupancy determination.

8. The method of claim 1, the step of transmitting streams further comprises:
   receiving an intent to connect to the room-host device from a client device;
   receiving content from the client device and displaying it on the shared display;
   encoding the shared display into a shared-display video stream; and
   sending, to the client-host device and the client device, the shared-display video stream.

9. Bridging video conference room system, comprising:
   a shared display;
   a camera;
   an audio system; and
   a network-enabled room-host device operatively coupled to the shared display, the camera and the audio system, the network-enabled room-host device adapted to:
   receive, from a client-host device, an intent to connect to the room-host device and host a meeting in a bridging video conference room by running video conference software on the client-host device;
access a calendar service to identify and parse a meeting invitation to create meeting metadata;
transmit the meeting metadata to client-host device to launch the video conference software on the client-host device; and
transmit streams from at least one of the shared display, the camera and the audio system to the client-host device for use by the video conference software.

10. The system of claim 9, wherein the room-host device is further adapted to parse a room calendar associated with the bridging video conference room to identify the meeting invitation.

11. The system of claim 10, wherein the meeting metadata further comprises at a Vendor Identifier, and a URI link.

12. The system of claim 10, wherein the meeting metadata further comprises a Meeting Start Time, a Meeting End Time and Meeting Title.

13. The system of claim 9, wherein the first client client-host device further comprises a desktop or laptop computer, tablet, or smart phone.

14. The system of claim 13, wherein the intent to connect to the room-host device further comprises a wireless connection to the room-host device.

15. The system of claim 14, the intent to connect to the room-host device further comprises detecting a presence of the client-host device in the video conference room based on a wireless occupancy determination.

16. The system of claim 9, wherein the room-host device is further adapted to:
receive an intent to connect to the room-host device from a client device;
receive content from the client device and displaying it on the shared display;
encode the shared display into a shared-display video stream; and
transmit, to the client-host device and the client device, the shared-display video stream.

17. A method for controlling a bridging video conference room system, the bridging video conference room system comprising a shared display, a camera and an audio system operatively coupled to a network-enabled room-host device, comprising:
operatively coupling a client device to the room-host device through a USB port;
transmitting meeting metadata to the client device to launch video conference software on the client device for hosting a meeting using the bridging video conference room system;
capturing streams from at least one of the shared display, the camera and the audio system at the room-host device to send to the client device;
encoding the captured streams into USB payloads using a network-variable buffering system, flow control, and error control to ensure smooth deliver of audio and video under variable network conditions;
transmitting the USB payloads to the client device; and
converting the USB payloads into USB packets for use by the video conference software running on the client device.

18. The method of claim 17, further comprising:
accessing a calendar service to identify and parse a meeting invitation to create meeting metadata.

19. The method of claim 17, wherein the step of encoding further comprises:
modifying the captured streams by adding metadata to the streams as they are encoded into the USB payloads.

20. The method of claim 19, wherein the metadata further comprises at least one of connection information, a universal resource indicator of the meeting, or a company name.

* * * * *